Sept. 12, 1933.  T. MIDGLEY, JR., ET AL  1,926,396
PROCESS OF PREVENTING FIRE BY NONTOXIC SUBSTANCES
Filed July 31, 1930
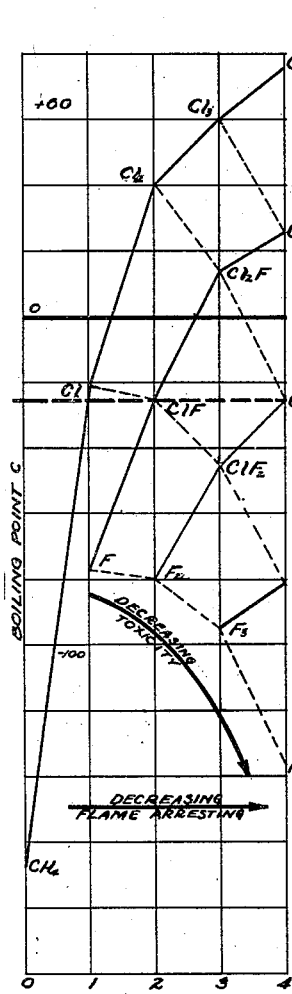
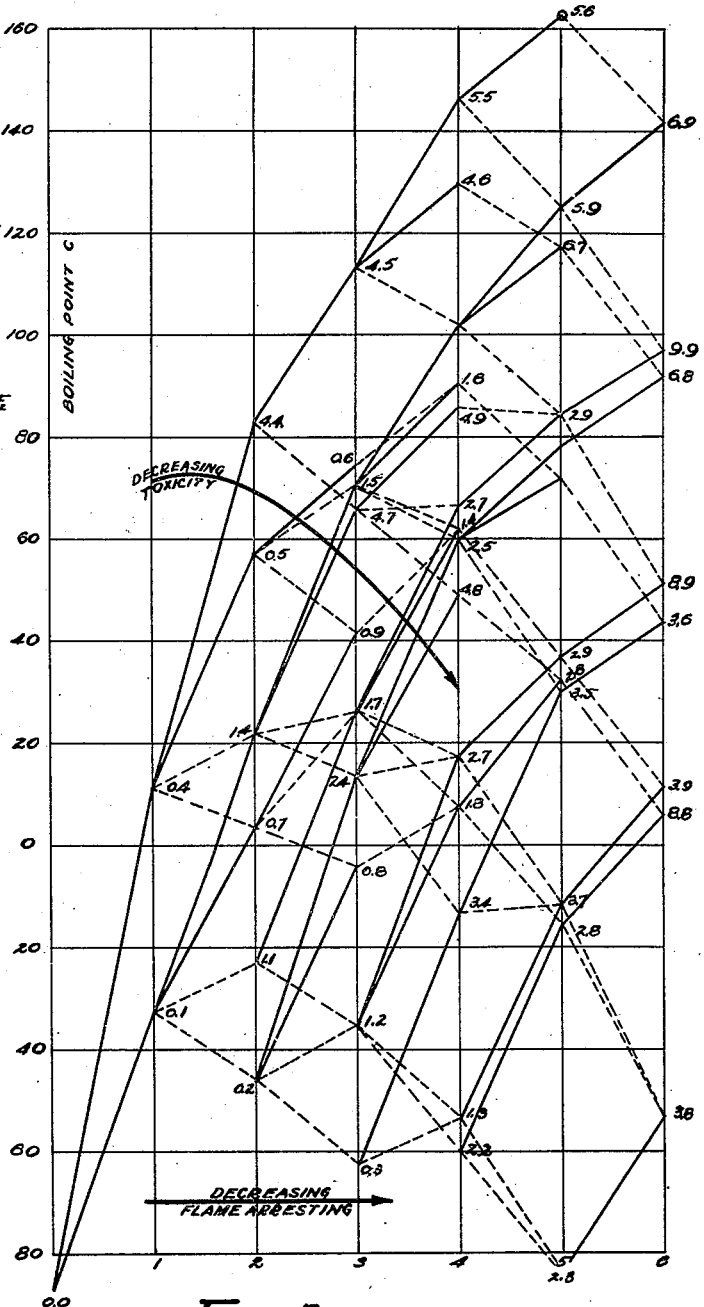

Patented Sept. 12, 1933

1,926,396

UNITED STATES PATENT OFFICE 1,926,396

PROCESS OF PREVENTING FIRE BY NONTOXIC SUBSTANCES

Thomas Midgley, Jr., Worthington, Albert L. Henne, Columbus, and Robert R. McNary, Dayton, Ohio, assignors to Frigidaire Corporation, Dayton, Ohio, a corporation of Delaware Application July 31, 1930. Serial No. 472,180

14 Claims. (Cl. 23—12)

This invention relates to putting out fires and its principal objects are to employ for this purpose the halogen derivative of hydrocarbon compounds containing fluorine which compounds have many desirable properties not present in the common flame arresters such as carbon dioxide, carbon tetrachloride, etc., which are now commonly employed.

We have found that the halo-derivatives of hydrocarbon compounds containing fluorine have fire extinguishing properties in varying degrees depending chiefly on the relative hydrogen atom content to total halogen content but varying also with the structure of the compound and in the direction shown by arrows on the accompanying drawing.

In the accompanying drawing Fig. 1 gives the compounds of the methane group and Fig. 2 parts taken together with the key gives compounds of the ethane group. The dash lines show direction of increase in other halogen content. These same general rules apply where bromine and iodine are used in place of chlorine in the compounds. In Fig. 1 the complete formula for each compound is found by making the halogen substitution for hydrogen in the formula $CH_4$. In Fig. 2 the character of each compound is given by numerals. As for example 1.7, represents the compound $CH_2F$—$CHClF$.

We prefer to use compounds in which the hydrogen atom content is not any greater than the total halogen atom content.

These flame arresters may be employed either with an apparatus from which they are pumped onto the flame in which case the compound may have a boiling point above warm temperature or they may be used in pressure devices in which a low boiling compound is employed which creates sufficient pressure to expel itself from the apparatus.

By way of example we may confine dichloro-difluoro-methane under pressure in a valved tank. When using this fire extinguisher the valve may be opened and the liquid stream produced by the pressure of the chemical itself discharges the flame arrester into the atmosphere near the burning material.

The method of charting may be employed with other groups of compounds coming within the general formula halo-derivatives of hydrocarbon compounds containing fluorine and including groups having a higher carbon content.

While the form of embodiment of the invention as herein disclosed, constitutes a preferred form, it is to be understood that other forms might be adopted, all coming within the scope of the claims which follow:

Not only are these compounds new as fire extinguishers but they present new properties within in this field and including non-toxicity and a mode of action which does not depend primarily on a blanketing effect as in the case with carbon dioxide and other common fire extinguishers.

What is claimed is as follows:

1. The process of arresting a flame which comprises directing into the atmosphere in the neighborhood of the flame a halo-derivative of a hydrocarbon containing fluorine.

2. The process of extinguishing a flame which comprises directing into the atmosphere in the neighborhood of the flame a halo-derivative of a hydrocarbon compound containing fluorine in which the hydrogen content is no greater than the total halogen content.

3. The process of extinguishing a flame comprising projecting into the atmosphere in the neighborhood of the flame dichloro-difluoro-methane.

4. The process of extinguishing a flame comprising projecting into the atmosphere in the neighborhood of the flame an organic derivative containing fluorine.

5. The process of extinguishing a flame comprising projecting into the atmosphere in the neighborhood of the flame an organic derivative containing fluorine and in which the hydrogen content is no greater than the total halogen content.

6. The process of extinguishing a flame comprising projecting into the atmosphere in the neighborhood of the flame an aliphatic derivative containing fluorine.

7. The process of extinguishing a flame comprising projecting into the atmosphere in the neighborhood of the flame an aliphatic derivative containing fluorine and in which the hydrogen content is no greater than the total halogen content.

8. The process of arresting a flame which comprises projecting into the atmosphere in the neighborhood of the flame a halo-fluoro derivative of methane.

9. The process of arresting a flame comprising projecting into the atmosphere in the neighborhood of the flame a halo-fluoro derivative of methane.

10. The process of arresting a flame comprising projecting into the atmosphere in the neighborhood of the flame a halo-fluoro derivative of ethane and in which the hydrogen content is no greater than the total halogen content.

11. The process of arresting a flame which comprises projecting into the atmosphere in the neighborhood of the flame a halo-fluoro derivative of methane and in which the total hydrogen content is no greater than the total halogen content.

12. The process of arresting a flame comprising projecting into the atmosphere in the neighborhood of the flame a halo-fluoro derivative of an aliphatic hydrocarbon.

13. The process of arresting a flame comprising projecting into the atmosphere in the neighborhood of the flame a halo-fluoro derivative of an aliphatic hydrocarbon and in which the hydrogen content is no greater than the total halogen content.

14. The process which comprises projecting into the atmosphere surrounding a possible point of combustion, a halo-fluoro derivative of methane.

THOMAS MIDGLEY, JR.
ALBERT L. HENNE.
ROBERT R. McNARY.

CERTIFICATE OF CORRECTION.

Patent No. 1,926,396.                                               September 12, 1933.

THOMAS MIDGLEY, JR., ET AL.

It is hereby certified that error appears in the printed specification of the above numbered patent requiring correction as follows: Page 1, line 107, claim 9, for "methane" read ethane; and that the said Letters Patent should be read with this correction therein that the same may conform to the record of the case in the Patent Office.

Signed and sealed this 21st day of November, A. D. 1933.

F. M. Hopkins (Seal)                                                   Acting Commissioner of Patents.